US009229648B2

(12) United States Patent
McDowell et al.

(10) Patent No.: US 9,229,648 B2
(45) Date of Patent: Jan. 5, 2016

(54) STORAGE ARRAY RESERVATION FORWARDING

(75) Inventors: Jonathan Andrew McDowell, San Francisco, CA (US); Siamak Nazari, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 203 days.

(21) Appl. No.: 13/563,628

(22) Filed: Jul. 31, 2012

(65) Prior Publication Data
US 2014/0040410 A1 Feb. 6, 2014

(51) Int. Cl.
G06F 15/16 (2006.01)
G06F 15/167 (2006.01)
G06F 15/177 (2006.01)
G06F 3/06 (2006.01)

(52) U.S. Cl.
CPC .............. *G06F 3/0637* (2013.01); *G06F 3/067* (2013.01); *G06F 3/0617* (2013.01); *G06F 3/0647* (2013.01)

(58) Field of Classification Search
CPC ..... G06F 3/0647; G06F 3/067; G06F 3/0607; G06F 3/0604; G06F 3/0629; H04L 67/1097
USPC ......... 709/201, 203, 213, 216, 217, 219, 220, 709/221
See application file for complete search history.

(56) References Cited

U.S. PATENT DOCUMENTS

| | | | |
|---|---|---|---|
| 7,315,914 B1 * | 1/2008 | Venkatanarayanan et al. ............. | 710/316 |
| 8,028,110 B1 | 9/2011 | Wigmore | |
| 8,468,180 B1 * | 6/2013 | Meiri et al. .................. | 707/809 |
| 8,600,943 B1 * | 12/2013 | Fitzgerald et al. ............ | 707/641 |
| 2005/0033888 A1 * | 2/2005 | Qi ................................ | 710/200 |
| 2006/0155944 A1 | 7/2006 | Kano | |
| 2006/0285550 A1 * | 12/2006 | Do et al. ........................ | 370/443 |
| 2007/0022314 A1 * | 1/2007 | Erasani et al. ................... | 714/4 |
| 2010/0205390 A1 * | 8/2010 | Arakawa ........................ | 711/162 |
| 2011/0179231 A1 * | 7/2011 | Roush ........................... | 711/152 |
| 2011/0225379 A1 * | 9/2011 | Eguchi et al. ................. | 711/162 |
| 2012/0072693 A1 * | 3/2012 | Mori et al. ..................... | 711/165 |

OTHER PUBLICATIONS

Tate, J. et al., Introduction to Storage Area Networks, <http://reg094.cct.lsu.edu/pdf//index.php?pdf=/storage/san/sf245470.pdf>.
Veritas Storage Foundation and High Availability Solutions Virtualization Guide, <http://www.google.com/url?sa=t&rct=j&q=& esrc=s&source=web&cd=3&ved=0CE8QFjAC.
Tate et al., Introduction to Storage Area Networks and System Networking, IBM Redbooks, Nov. 2012.
Solaris, Veritas Storage Foundation and High Availability Solutions Virtualization Guide 5.1.

* cited by examiner

*Primary Examiner* — Edward Kim
(74) *Attorney, Agent, or Firm* — Patent Law Group LLP (57) ABSTRACT

A method is provided for a destination storage system to handle SCSI-3 reservations. The method includes discovering a volume on a source storage system when the source storage system exports the volume to the destination storage system, exporting the volume to host computer systems, locally registering keys for first paths to the destination storage system, and registering with the source storage system the keys for second paths to the source storage system. When one of the host computer systems requests to reserve the volume, the method includes locally reserving the volume for paths to the destination storage system with registered keys and performing reservation forwarding to request the source storage system to reserve the volume for paths to the source storage system with registered keys.

20 Claims, 9 Drawing Sheets

STORAGE ARRAY RESERVATION FORWARDING

BACKGROUND

A storage array is a storage system that contains multiple drives. It has cache memory and functionalities such as RAID (redundant array of independent disks) and virtualization. A storage area network (SAN) is a network that can provide access to consolidated, block level data storage. It can be used to make storage devices, such as storage arrays, accessible to host computers (e.g., server computers) so that the storage devices appear as locally attached devices to the operating systems on the host computers.

BRIEF DESCRIPTION OF THE DRAWINGS

In the drawings.

Use of the same reference numbers in different figures indicates similar or identical elements.

DETAILED DESCRIPTION

As explain above, a storage area network (SAN) is a network that can provide access to consolidated, block level data storage. It can be used to make storage devices, such as storage arrays, accessible to host computers (e.g., server computers) so that the storage devices appear as locally attached devices to the operating systems on the host computers. When multiple host computers access the same storage array, a reservation system is used to grant access among the servers to ensure data consistency. Small Computer System Interface (SCSI) reservations can provide a mechanism for hosts to restrict or fence off access to a volume on a storage array and are used by many host clustering technologies.

SCSI-2 reservations can provide the ability for a single host/array path to be marked as reserved, preventing access to the volume from any other host/array path (even from the same host).

SCSI-3 reservations can extend upon this to allow each host/array path to have a key registered against it. Typically a host will register the same key upon all of the paths it sees to the storage array and each host will have its own unique key. Once a key is registered along a path, all input/output requests on that path are treated as being associated with that key. Access to the volume can then be restricted to those hosts who have registered keys. Should a host be determined to have been given unrestricted access or gone rogue, its key can be revoked by any of the still active hosts, causing the rogue host to lose access to the volume. Once the host has taken appropriate action to become healthy again, it can register a new key and regain access.

In one example, it may be necessary to migrate data from a source storage system (e.g., a source storage array) to a destination storage system (e.g., a destination storage array). To migrate data, the destination storage system is added as a host to the source storage system so the destination storage system can access the data in a volume on the source storage system. To avoid or reduce disrupting host access during data migration, destination storage system exports the volume to other host computers so they can access the volume via the destination storage system even when the paths between the host computers and the source storage system are later removed during the data migration. In an initial configuration phase of the data migration before the paths between the host computers and the source storage system are removed, the host computers have access to the volume via both the source storage system and the destination storage system. During this phase, both the source storage system and the destination storage system may receive competing SCSI reservations for the volume from different host computers. Thus, there is a need for techniques that allow the destination storage system to handle the competing SCSI reservations for the volume without disrupting host access to the volume.

Figure 1:
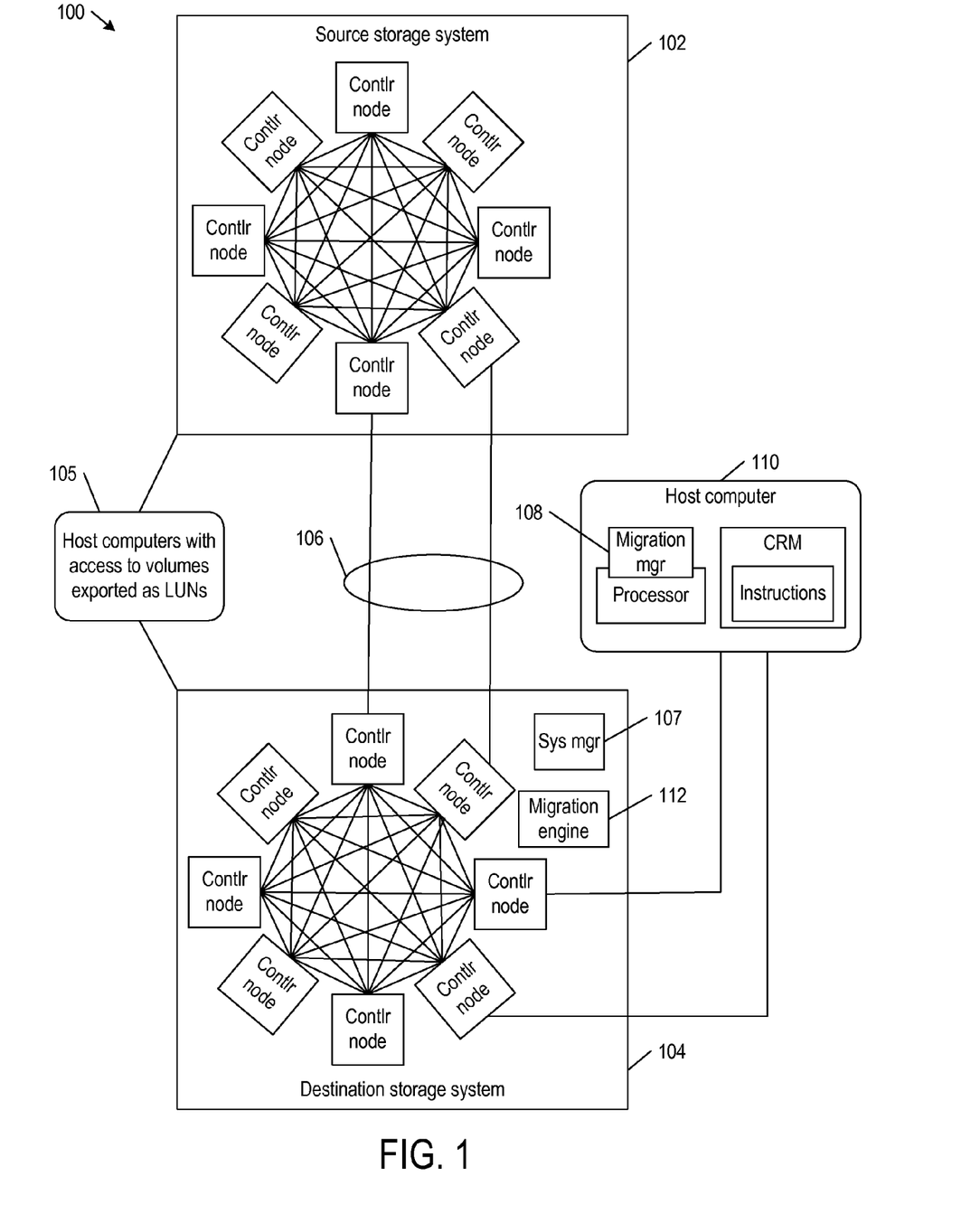
FIG. 1 is a block diagram of a storage area network (SAN) in one example of the present disclosure.

FIG. 1 is block diagram showing a Storage Area Network (SAN) 100 in one example of the present disclosure. The SAN 100 includes a source storage system 102 (e.g., a destination storage array) and a destination storage system 104 (e.g., a source storage array) coupled by two paths 106 which can include Fibre Channel, Internet Small Computer System Interface (iSCSI) links, or any other communication technique. The destination storage system 104 is defined as a host on source storage system 102 so destination storage system 104 may discover and access volumes on source storage system 102.

The destination storage system 104 has a virtual volume (VV) layer that creates external volumes presented to host computers 105, and a logical disk (LD) layer that implements RAID functionality over the raw storage in the system's physical drives (PDs). A system manager 107 allows users to create VVs and export them (make visible and accessible) to hosts as logical unit numbers (LUNs).

The destination storage system 104 includes a low-level migration engine 112, also known as the region mover, at the LD level that copies and mirrors data between sets of LDs mapped to physical disks (PDs). The LD mirroring process duplicates any host writes to both locations, ensuring data consistency. In one example, a migration manager 108 on a host computer 110 uses migration engine 112 in a method to migrate volumes from source storage system 102 to destination storage system 104. In another example, migration manager 108 uses migration engine 112 in methods to convert a fully-provisioned VV (FPVV) on storage system 104 to a thinly-provisioned VV (TPVV) and vice versa. The migration manager 108 may be implemented with executable instructions for a processor in host computer 110. The executable instructions may be stored in a non-transitory computer readable medium, such as a hard disk drive, a solid state drive, or another type of nonvolatile memory. The host computer 110 is coupled to destination storage system 104.

The destination storage system 104 includes a full mesh backplane that joins multiple controller nodes to form a cache-coherent cluster. In one example, each controller node may contain processing complexes, memories, and network interface cards for data movement and control functions (e.g., an ASIC and associated memory for data movement, and central processing units and associated memory for control functions). Controller nodes are paired and each pair is connected to dual-ported drive chassis (or drive cages) owned by that pair. In addition, each controller node has one or more paths to hosts. The clustering of controller nodes enables data storage system 104 to present to hosts a single, highly available, high-performance storage system. Hosts can access VVs over any host-connected port even if the PDs for that data are connected to a different controller node.

Figure 2:
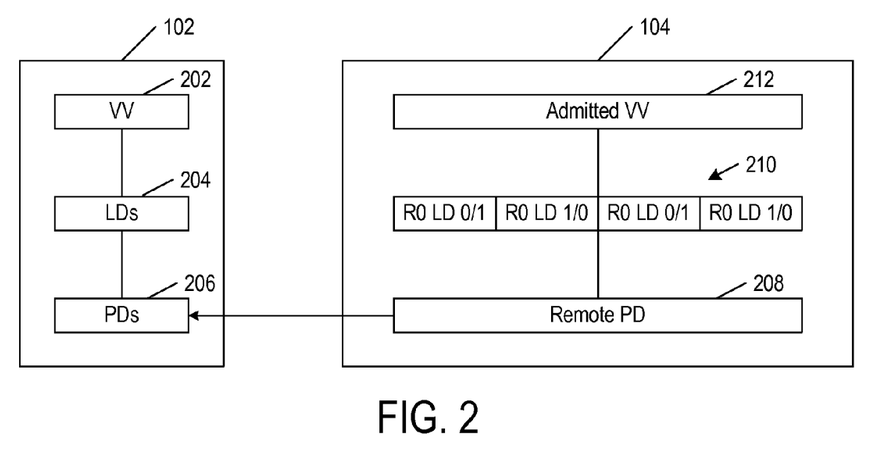
FIG. 2 is a block diagram of a volume presented by a source storage system and a destination storage system of FIG. 1 in one example of the present disclosure.

FIG. 2 is a block diagram of a volume presented by source storage system 102 and destination storage system 104 in one example of the present disclosure. The source storage system 102 has a volume 202 exported to hosts, including destination storage system 104 and host computers 105 (FIG. 1). In one example, volume 202 is a VV mapped to a set of LDs 204, which are mapped a number of PDs 206.

On destination storage system 104, system manager 107 (FIG. 1) admits VV 202 as a type of remote PD called a physical disk virtual volume (PDVV) 208. In one example, a PVDD is a data structure created by system manager 107 to present VV 202 as a PD to the LD layer on destination storage system 104 so that LDs can map to PDVV 208. The system manager 107 then creates a set of RAID 0 (R0) LDs 210 on PDVV 208, and creates an admitted VV 212 on R0 LDs 210 so hosts coupled to destination storage system 104 can access VV 202 on source storage system 102. The R0 LDs 210 are assigned to a set of node pairs to distribute workload among the primary nodes and allow a backup node to take over when the primary node is offline. The primary and backup nodes in the node pairs are those in communication with source system 102 (e.g., nodes 0 and 1). The R0 LDs 210 are RAID level 0 as they are mapped to a single PDVV 208. The admitted VV 212 is similar to a fully-provisioned VV except it has no data in destination storage system 104 and cannot be tuned (change layout of a VV), grown, setvv'ed (modify a VV to use a new name, to change CPG, set allocation warnings, or use new policies), exported, or snapped.

To avoid disrupting host access during a data migration from source storage system 102 to destination storage system 104, destination storage system 104 exports admitted VV 212 to host computers 105 so host computers 105 may access VV 202 via destination storage system 104 after the paths between source storage system 102 and host computers 105 are removed during the data migration. In the initial configuration phase of the data migration before the paths between source storage system 102 and host computers 105 are removed, host computers 105 have access to VV 202 via both source storage system 102 and destination storage system 104. During this phase, both source storage system 102 and destination storage system 104 may receive competing SCSI reservations from different host computers 105 for exclusive control of VV 202. Thus, there is a need for techniques that allow source storage system 102 and destination storage system 104 to handle the competing SCSI reservations for VV 202 without disrupting host access to VV 202.

In one example of the present disclosure, a destination storage system can operate in a pass-through state during an initial configuration phase of a data migration from a source storage system to the destination storage system. In this state, the destination storage system forwards I/O requests, including SCSI-2 reservations, from host computers to the source storage system, as well as performs its normal internal processing of these reservations, to ensure that the requesting host computer gains the exclusive access it is requesting against all other host computers, whether the host computers are connected to the source or the destination storage system.

If the source storage system has an outstanding reservation against it, the reservation is faithfully reported back to any host computer attempting to access data via the destination storage system, ensuring the requesting application on the host computer is aware of the reason for the request failure and is able to perform its retry logic.

After the initial configuration phase, the data migration may be started on the destination storage system. At this point it is not necessary to forward SCSI-2 reservation to the source storage system and the host computers are disconnected from the destination storage system.

Figure 3:
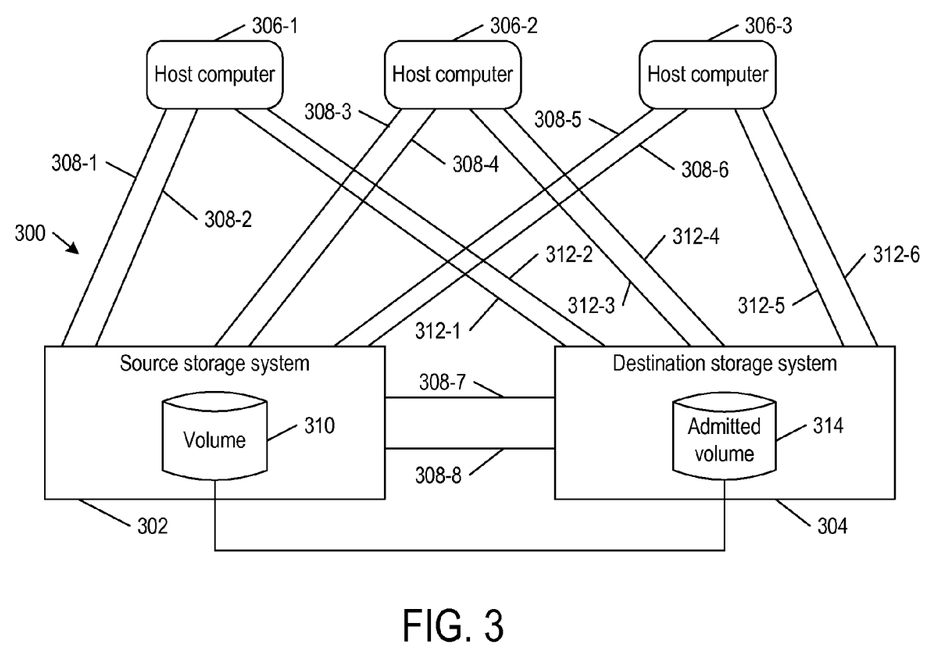
FIG. 3 is a block diagram illustrating a SAN with a source storage system and a destination storage system in one example of the present disclosure.

FIG. 3 is a block diagram illustrating a SAN 300 with a source storage system 302 and a destination storage system 304 in one example of the present disclosure. The source storage system 302 and destination storage system 304 may be implemented like source storage system 102 (FIG. 1) and destination storage system 104 (FIG. 1), respectively. The host computers 306-1, 306-2, and 306-3 (referred to as "host computers 306" collectively or "host computer 306" for a generic individual host computer) may be initially coupled to source storage system 302 before destination storage system 304 is added to SAN 300. Each host computer 306 is coupled by one or more paths to source storage system 302. For example, host computer 306-1 is coupled by paths 308-1, 308-2 to source storage system 302, host computer 306-2 is coupled by paths 308-3, 308-4 to source storage system 302, and host computer 306-3 is coupled by paths 308-5, 308-6 to source storage system 302. The host computers 306 are defined as hosts on source storage system 302, which allows source storage system 302 to export a volume 310 (e.g., a virtual volume) to host computers 306. Once host computers 306 discover the exported volume 310, they are able to access volume 310 via source storage system 302.

When destination storage system 304 is added to SAN 300, each host computer 306 is coupled by one or more paths to destination storage system 304. For example, host computer 306-1 is coupled by paths 312-1, 312-2 to destination storage system 304, host computer 306-2 is coupled by paths 312-3, 312-4 to destination storage system 304, and host computer 306-3 is coupled by paths 312-5, 312-6 to destination storage system 304. The host computers 306 are defined as hosts on destination storage system 304.

The destination storage system 304 is also coupled by one or more paths to source storage system 302. For example, destination storage system 304 is coupled by paths 308-7 and 308-8 to source storage system 302. The destination storage system 304 is defined as a host on source storage system 302, which allows source storage system 302 to export volume 310 to destination storage system 304. Once destination storage system 304 discovers the exported volume 310, it is able to access volume 310 via source storage system 302. The destination storage system 304 admits volume 310 and exports an admitted volume 314 to host computers 306. The destination storage system 304 assigns the exported admitted volume 314 the same unique identifier (e.g., the same World Wide Name) as volume 310 so host computers 306 believes it is accessing the same volume. Once host computers 306 discover the exported admitted volume 314, they are able to access volume 310 via destination storage system 304 as well as source storage system 302.

Figure 4:
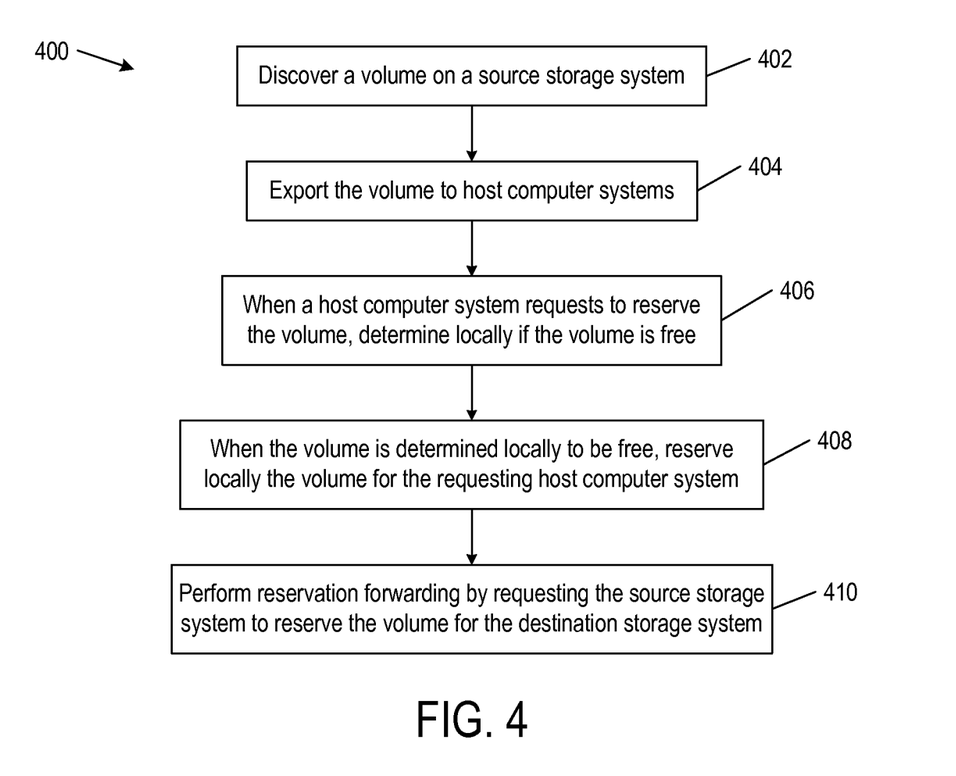
FIG. 4 is a flowchart of a method for the destination storage system of FIG. 3 to handle SCSI-2 reservations from host computers in one example of the present disclosure.

FIG. 4 is a flowchart of a method 400 for destination storage system 304 (FIG. 3) to handle SCSI-2 reservations from host computers 306 (FIG. 3) in one example of the present disclosure. The method 400 may be implemented by a system manager on destination storage system 304. The system manager may be implemented by instructions stored on a non-transitory computer readable medium, such as a hard disk drive, a solid state drive, or another type of non-volatile memory, and executed by processors in controller nodes of destination storage system 304. The method 400 may begin in block 402.

In block 402, destination storage system 304 discovers volume 310 (FIG. 3) on source storage system 302 (FIG. 3). For destination storage system 304 to discover volume 310, source storage system 302 exports volume 310 to destination storage system 304. Once destination storage system 304 discovers volume 310, destination storage system 304 is able to access volume 310 via source storage system 302. The block 402 may be followed by block 404.

In block 404, destination storage system 304 exports volume 310 to host computer systems 306 so host computers 306 are able to discover volume 310 on destination storage system 304. Once host computers 306 discover volume 310, host computer systems 306 are able to access volume 310 via destination storage system 304. The block 404 may be followed by block 406.

In block 406, when a host computer 306 requests to reserve volume 310, destination storage system 304 determines locally if volume 310 is free (not reserved). The requesting host computer 306 requests to reserve volume 310 by sending a SCSI-2 reserve command for a particular path to destination storage system 304. The block 406 may be followed by block 408.

In block 408, when destination storage system 304 determines locally that volume 310 is free, destination storage system 304 reserves locally volume 310 for the requesting host computer 306 so only the requesting host computer 306 has permission to access volume 310 along the specified path. The block 408 may be followed by block 410.

In block 410, destination storage system 304 performs reservation forwarding by requesting source storage system 302 to reserve volume 310 for the destination storage system 304. The destination storage system 304 requests to reserve volume 310 by sending a SCSI-2 reserve command for a particular path to source storage system 302. If destination storage system 304 is able to reserve volume 310, then only the requesting host computer 306 can access volume 310 along the specified paths.

Figure 5:
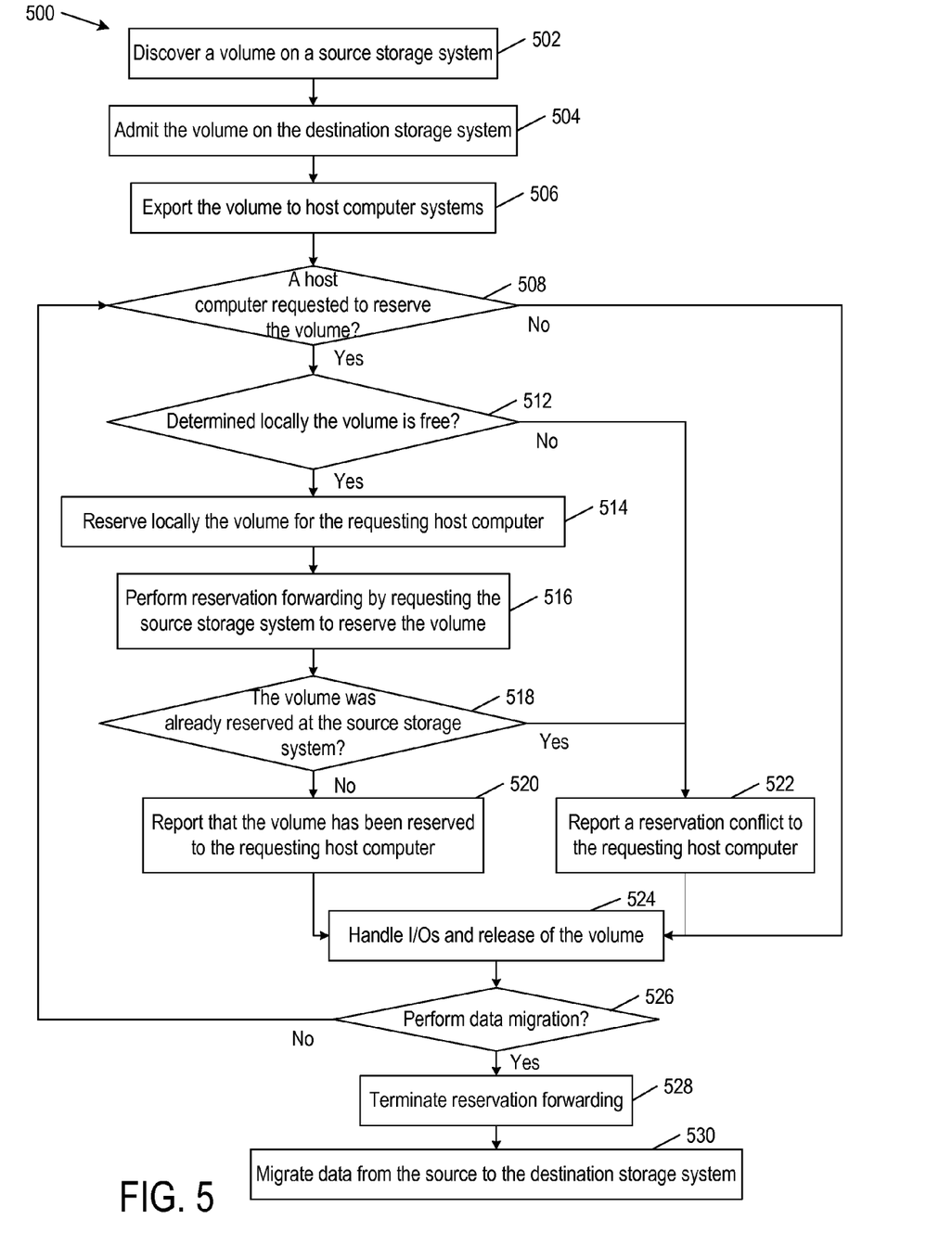
FIG. 5 is a flowchart of a method for the destination storage system of FIG. 3 to handle SCSI-2 reservations from host computers in another example of the present disclosure.

FIG. 5 is a flowchart of a method 500 for destination storage system 304 (FIG. 3) to handle SCSI-2 reservations from host computers 306 (FIG. 3) in one example of the present disclosure. The method 500 may be implemented by a system manager on destination storage system 304. The method 500 is a variation of method 400 (FIG. 4). The method 500 may begin in block 502.

In block 502, destination storage system 304 discovers volume 310 (FIG. 3) on source storage system 302. The destination storage system 304 is defined as a host on source storage system 302 and source storage system 302 exports volume 310 to destination storage system 304 so destination storage system 304 is able to discover and access volume 310 via source storage system 302. The block 502 may be followed by block 504.

In block 504, destination storage system 304 admits volume 310 so admitted volume 314 (FIG. 3) may be exported to host computer systems 306. The block 504 may be followed by block 506.

In block 506, destination storage system 304 exports admitted volume 314 to host computers 306 so host computers 306 are able to discover and access volume 310 via destination storage system 304. The destination storage system 304 exports admitted volume 314 with the same WWN as volume 310 so host computers 306 believes it is accessing the same volume. Block 506 may be followed by block 508.

In block 508, destination storage system 304 determines if a host computer 306 has requested to reserve volume 310. The requesting host computer 306 requests to reserve volume 310 by sending a SCSI-2 reserve command to destination storage system 304 for a particular path to destination storage system 304. If a host computer 306 has requested to reserve volume 310, block 508 may be followed by block 512. Otherwise block 508 may be followed by block 524.

In block 512, destination storage system 304 locally determines if volume 310 is free. If so, block 512 may be followed by block 514. Otherwise block 512 may be followed by block 522.

In block 514, destination storage system 304 locally reserves volume 310 for the requesting host computer 306 so only the requesting host computer 306 has permission to access volume 310 along the specified path to destination storage system 304. The block 514 may be followed by block 516.

In block 516, destination storage system 304 performs reservation forwarding by requesting source storage system 302 to reserve volume 310 for destination storage system 304. The destination storage system 304 requests to reserve volume 310 by sending a SCSI-2 reserve command for a particular path to source storage system 302. The block 516 may be followed by block 518.

In block 518, destination storage system 304 determines if source storage system 302 has reported back that volume 310 is already reserved at source storage system 302 by another host computer 306. If so, block 518 may be followed by block 522. Otherwise block 518 may be followed by block 520.

In block 520, destination storage system 304 reports back to the requesting host computer 306 that volume 310 has been reserved for the requesting host computer 306 (also called "the owner host computer 306"). The block 520 may be followed by block 524.

In block 522, destination storage system 304 reports a reservation conflict back to the requesting host computer 306 as volume 310 has already been reserved either at source storage system 302 or destination storage system 304 by another host computer 306. In response, the requesting host computer 306 performs it retry logic. The destination storage system 304 also cancels the local reservation for volume 310 by requesting host computer 306. The block 522 may be followed by block 524.

In block 524, destination storage system 304 handles I/O requests from host computer systems 306 to volume 310 and any release of volume 310. When a reservation has been placed on volume 310 locally at destination storage system 304, destination storage system 304 only allows I/O requests from the owner host computer 306 along the specified path. Other host computers 306 receive a reservation conflict message when they attempt to access volume 310 via destination storage system 304.

Similarly, when a reservation has been placed on volume 310 at source storage system 302, source storage system 302 only allows I/O request from the owner host (destination storage system 304 or a host computer 306) along the specified path. If destination storage system 304 receives a reservation conflict message when it attempts to access volume 310 via source storage system 302, it will report the reservation conflict back to the requesting host computer 306. In response, the requesting host computer 306 performs retry logic.

The destination storage system 304 may receive a request to release a volume 310 from the owner host computer 306. If so, destination storage system 304 removes the reservation on volume 310 and allows all host computers 306 to access volume 310 via destination storage system 304. The block 524 may be followed by block 526.

In block 526, destination storage system 304 determines if it is to perform data migration. If so, block 526 may be followed by block 528. Otherwise block 526 may be followed by block 508.

In block 528, destination storage system 304 terminates reservation forwarding. At this time, source storage array 302 is disconnected from host computers 306 so host computer systems 306 can only access volume 310 via destination storage system 304. The block 528 may be followed by block 530.

In block 530, destination storage system 304 migrates data from source storage system 302.

As described herein, in one example, SCSI-3 persistent reservations may allow each host computer to register a key along multiple paths to a storage system in order to marshal access to storage and/or fence off host computers that are believed to no longer be part of the active cluster. As described above, in one example, a destination storage array is presented as a host to a source storage array during a data migration and the destination storage array forwards I/O requests for host computers that are in the process of migrating between arrays. The destination storage system cannot simply forward SCSI-3 persistent reservations from host computers to the source storage system like SCSI-2 reservations because the number of paths between the destination and the source storage systems may be less than the number of the host computers so there may not be a one-to-one correspondence between keys and paths.

In one example of the present disclosure, the destination storage system instantiates a new profile or persona for each host computer that wishes to perform a SCSI-3 persistent reservation. When Fibre Channel is used to connect the storage systems, the destination storage system may use N_Port ID Virtualization (NPIV) techniques to create multiple paths between virtual ports sharing a single physical port at the destination storage array and a physical port at the source storage array. When iSCSI is used to connect the storage systems, the destination storage array may crate multiple paths between virtual IP addresses sharing a single physical port at the destination storage array and a physical port at the source storage array. In one example, NPIV and the virtual IP addresses can be used on destination storage system 304 to present itself to source storage system 302 as multiple separate virtual paths over a single real physical path without changing anything at source storage system 304.

In another example, the destination storage system also internally processes the reservation requests so that its local state reflects the state of the source storage system with respect to outstanding reservations and registered keys.

In one example, the use of individual personas for each host computer may allow the destination storage system to faithfully pass through any reservation conflict to the correct host computer, while allowing other host computers to continue to access data. Also host computers being masked or masqueraded by the destination storage system retain the ability to evict host computers still only connected to the source storage system from cluster membership.

In another example, this continuity of access and reservation request processing may allow all host computers to move to the destination storage system without disrupting host access during the process.

Figure 6:
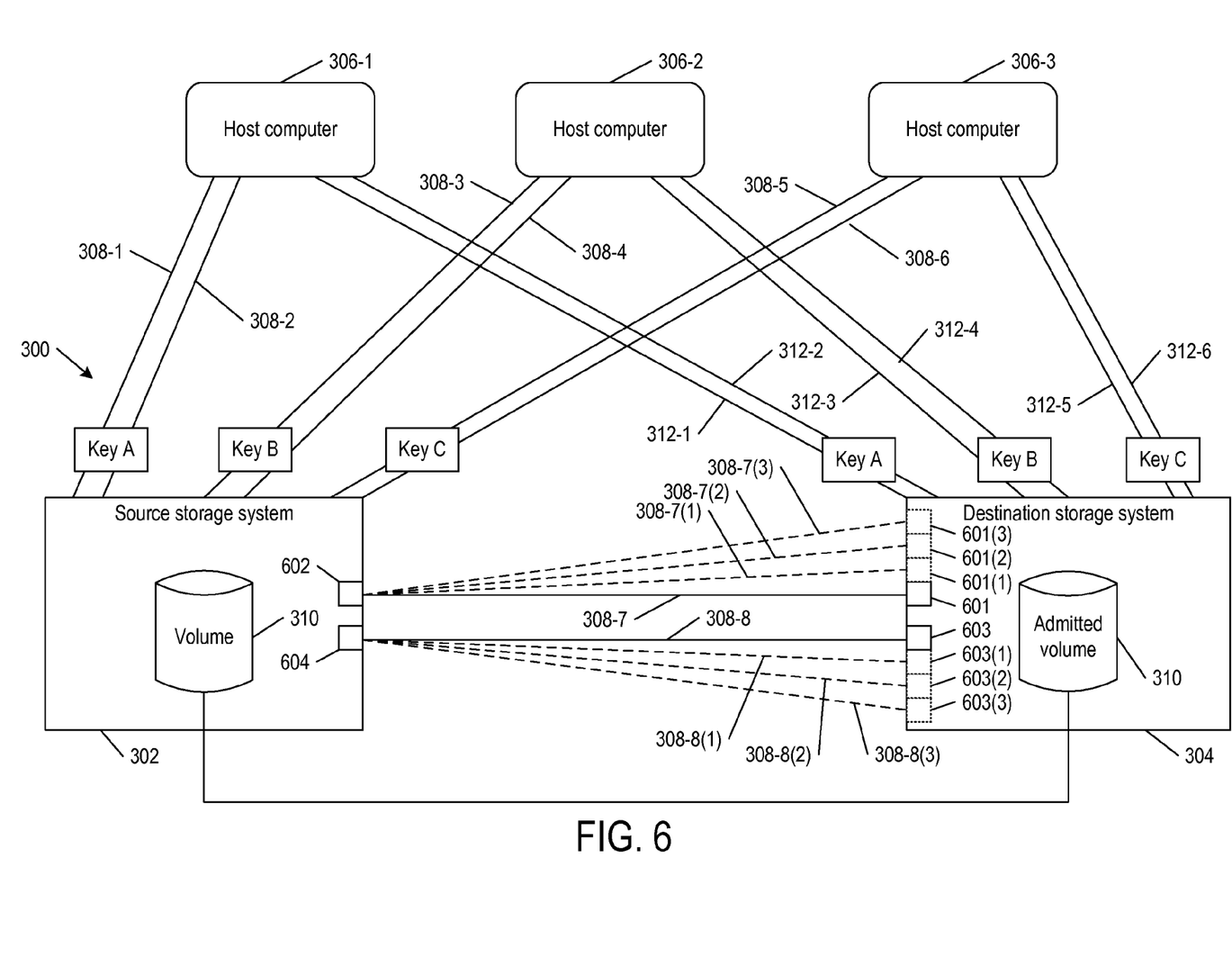
FIG. 6 is a block diagram illustrating a SAN with a source storage system and a destination storage system in another example of the present disclosure.

FIG. 6 is a block diagram illustrating a SAN 600 with source storage system 302 and destination storage system 304 in one example of the present disclosure. The SAN 600 is similar to SAN 300. As shown in more detail, path 308-7 represents a nexus or link between a physical port 601 at destination storage system 304 and a physical port 602 at source storage system 302, and path 308-8 represents a nexus or link between a physical port 603 at destination storage system 304 and a physical port 604 at source storage system 302. Each physical port presents a single WWN. Using NPIV techniques, destination storage system 304 generates a collection of virtual ports sharing physical ports 601 and 603, such as virtual ports 601(1), 601(2), 601(3) at physical port 601 and virtual ports 603(1), 603(2), and 603(3) at physical port 603. The WWNs of the virtual ports may be based off the physical port WWN.

Each host computer 306 registers its key across all paths it sees to volume 310. For example, host computer 306-1 registers a key A along paths 308-1, 308-2 with source storage system 302 and along paths 312-1, 312-2 with destination storage system 304. The host computer 306-2 registers a key B along paths 308-3, 308-4 with source storage system 302 and along paths 312-3, 312-4 with destination storage system 304. The host computer 306-3 registers a key C along paths 308-5, 308-6 with source storage system 302 and along paths 312-5, 312-6 with destination storage system 304.

The destination storage system 304 performs its own internal processing to add the keys to its local state for the paths. After this succeeds, destination storage system 304 assigns new virtual ports to each host and registers their keys against source storage system 302 using both paths 308-7 and 308-8 with these virtual IDs of the virtual ports. Registration may fail if source storage system 302 no longer has available resources (systems may have a limit on the number of paths/keys that can be registered).

The result is shown in FIG. 6, in one example, with all host computers 306 having registered their own unique keys against their paths, and destination storage system 304 having used a new virtual port to represent each registered key across both paths 308-7 and 308-8 destination storage system 304 has to source storage system 302. For example, destination storage system 304 registers key A against paths 308-7(1) and 308-8(1) for computer 306-1, key B against paths 308-7(2) and 308-8(2) for computer 306-2, and key C against paths 308-7(3) and 308-8(3) for computer 306-3. Access to all hosts is granted, and any other host that has not registered a key ends up using paths 308-7 and 308-8 directly and being blocked if there are reservations in place.

If host 306-2 is determined to have unrestricted access or gone rogue, hosts 306-1 and 306-3 may remove or reject it out of the cluster and revoke key B via destination storage system 304. The host 306-2 no longer has access to volume 310 as destination storage system 304 will update its local status to revoke key B and also forward the request along path 308-7 or 308-8 to revoke key B at source storage system 302. It is important that destination storage system 304 represents or masquerades itself as host computer 306-1 for this revocation as host computer 306-2 may also remove or reject host computer 306-1 from the cluster but has send the revocation request via source storage system 302. The destination storage system 304 may represent or masquerade itself as the host computer in question (i.e., the key owner) by sending the revocation command to source storage system 302 along the virtual path associated with that key. Therefore, if host computer 306-1 is revoking key B via destination storage system 304, destination storage system will choose path 601(1) or 603(1) to forward the revocation to source storage system 302 so that the revocation comes along a path that has key A registered against it.

In one example, whichever host computer can access source storage system 302 first controls the reservation process as the local state of destination storage system 304 ultimately reflects the state of source storage system 302. After this point, host computer 306-2 no longer has a key registered so it falls back to paths 308-7 and 308-8 for any access requests it makes. Paths 308-7(2) and 308-8(2) may become available when host computer 306-2 rejoins the cluster and registers a new key.

Alternatively host 306-1 may revoke key B via source storage system 302. At this point destination storage system 304 is unaware anything has changed, and continues to forward I/O requests for computer 306-2 over paths 312-3 and 312-4. However, key B was also registered on paths 308-7(2) and 308-8(2) and is now revoked, source storage system 302 will reject these requests so computer 306-2 is still denied access. The destination storage system 304 may pick up the error response, as well as forwarding it to computer 306-2, and use it to discover that it should rescan source storage system 302 to read the currently registered keys and update its own local state.

Figure 7:
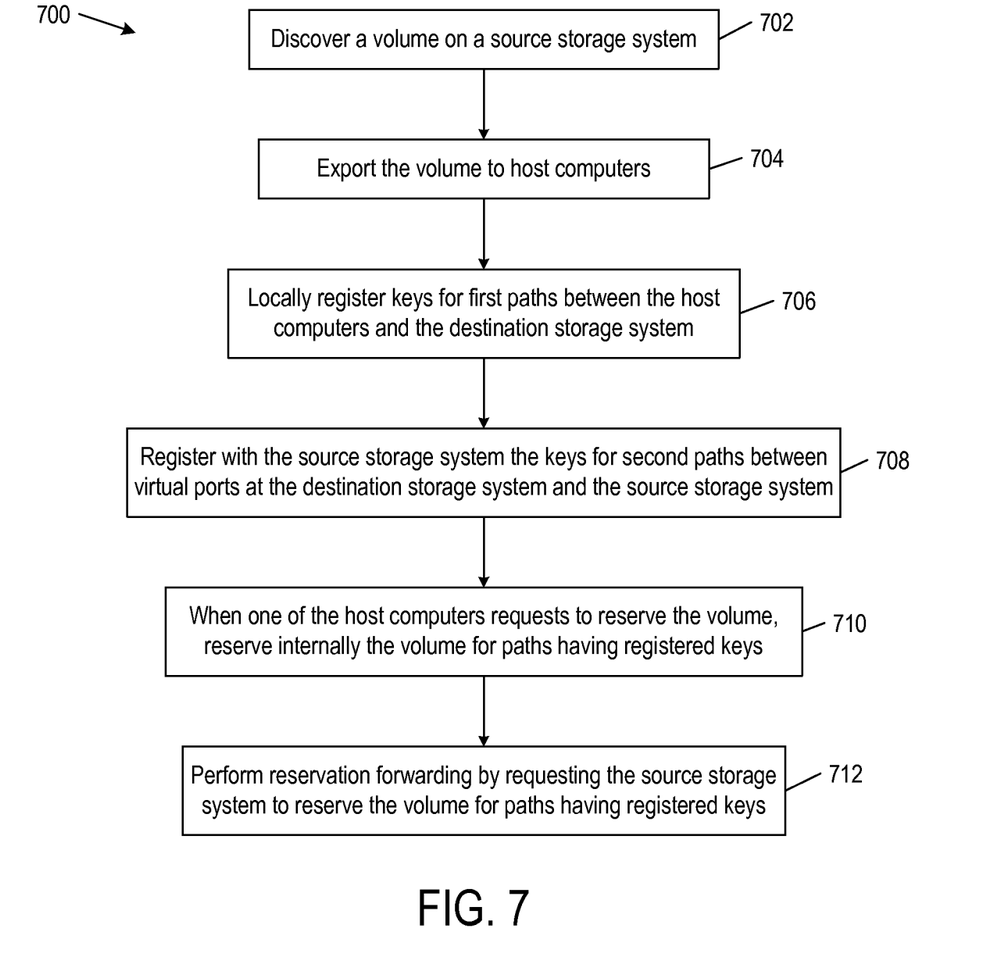
FIG. 7 is a flowchart of a method for the destination storage system of FIG. 6 to handle SCSI-3 reservations from the host computers in FIG. 6 in one example of the present disclosure.

FIG. 7 is a flowchart of a method 700 for destination storage system 304 (FIG. 6) to handle SCSI-3 reservations from host computers 306 (FIG. 6) in one example of the present disclosure. The method 700 may be implemented by a system manager on destination storage system 304. The method 700 may begin in block 702.

In block 702, destination storage system 304 discovers volume 310 on source storage system 302. For destination storage system 304 to discover volume 310, source storage system 302 first exports volume 310 to destination storage system 304. Once destination storage system 304 discovers volume 310, destination storage system 304 is able to access volume 310 via source storage system 302. The block 702 may be followed by block 704.

In block 704, destination storage system 304 exports volume 310 to host computers 306 so host computers 306 are able to discover volume 310 on destination storage and access volume 310 via destination storage system 304. The block 704 may be followed by block 706.

In block 706, destination storage system 304 registers internally keys for paths 308-1 to 308-6 between host computers 306 and destination storage system 304. This occurs in response to host computers 306 requesting to register their keys to corresponding paths 308-1 to 308-6 between the respective host computers 306 and destination storage system 304. The block 706 may be followed by block 708.

In block 708, destination storage system 304 registers with source storage system 302 the keys for virtual paths 308-7(1), (2), (3) and 308-8(1), (2), (3). The block 708 may be followed by block 710.

In block 710, when a host computer 306 requests to reserve volume 310, destination storage system 304 reserves internally volume 310 only for paths that have registered keys. If another host computer 306 uses a revoked key to request access to volume 310 via destination storage system 304, destination storage system 304 would report back a reservation conflict to the requesting host computer 306. The block 710 may be followed by block 712.

In block 712, destination storage system 304 performs reservation forwarding by requesting source storage system 302 to reserve volume 310 (FIG. 3) only for paths that have registered keys. If another host computer 306 uses a revoked key to request access to volume 310 via source storage system 302, source storage system 302 would report back a reservation conflict to the requesting host computer 306.

Figure 8:
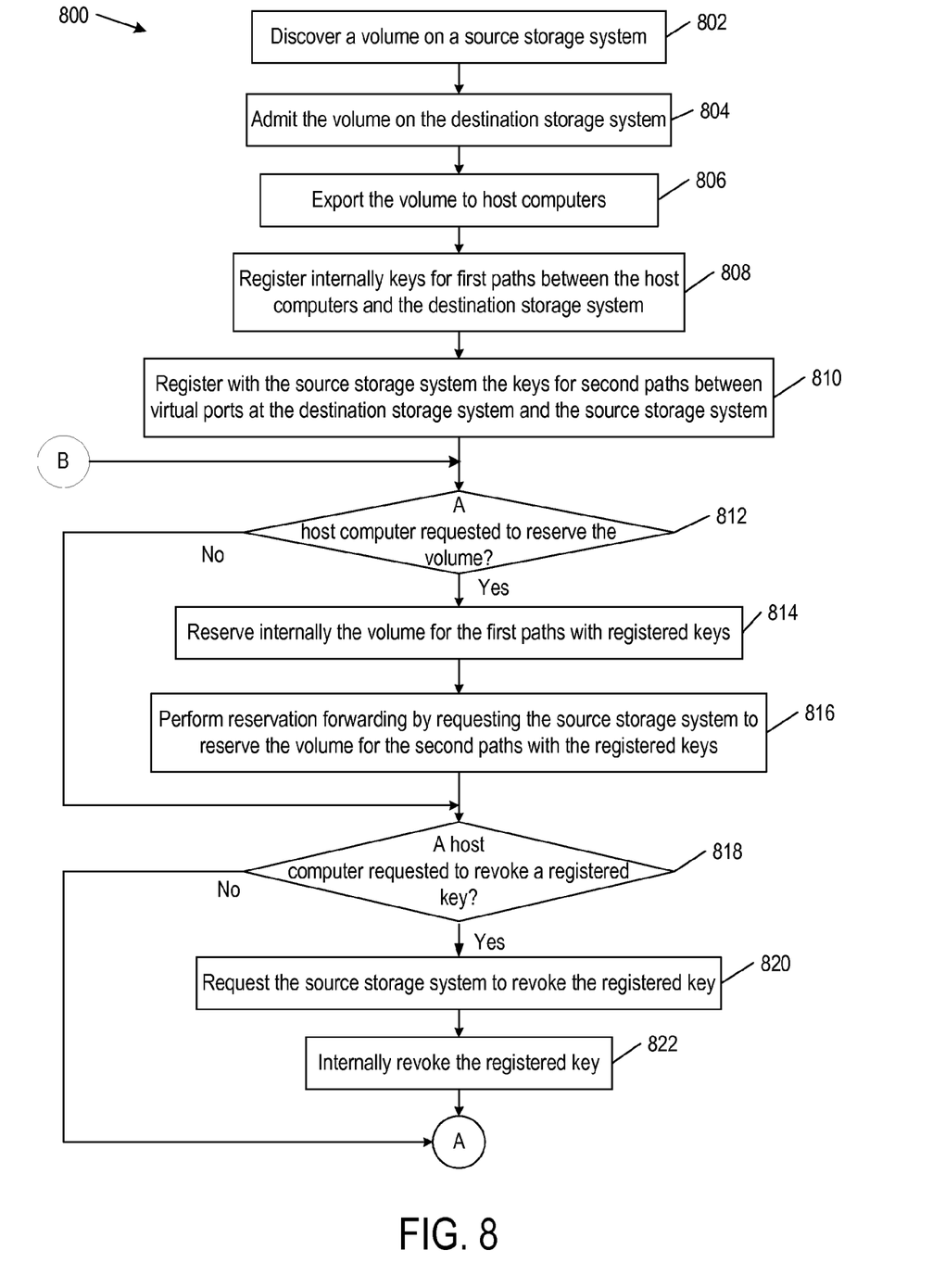
FIGS. 8 and 9 form a flowchart of a method for the destination storage system of FIG. 6 to handle SCSI-3 reservations from the host computers in FIG. 6 in another example of the present disclosure.
Figure 9:
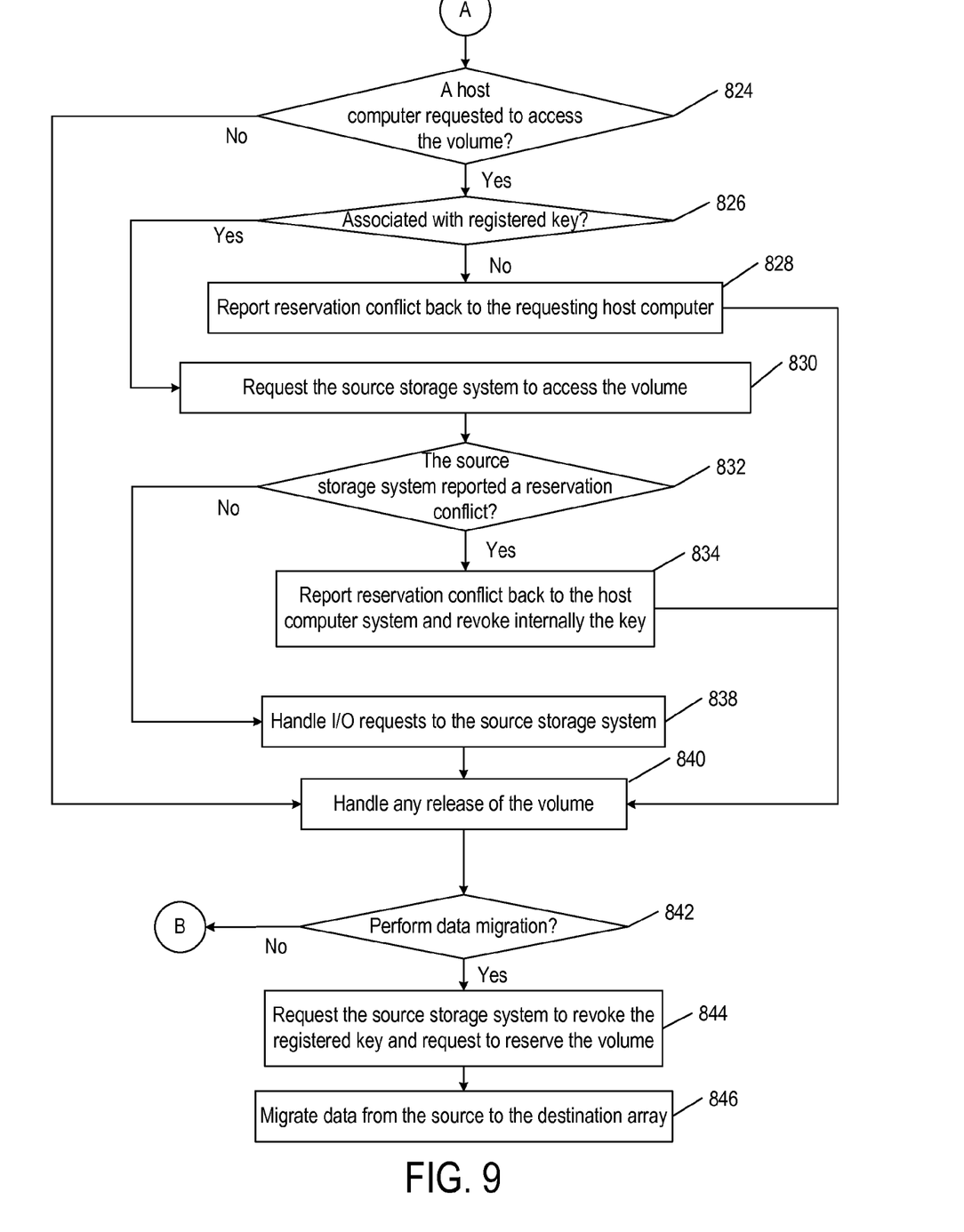

FIGS. 8 and 9 form a flowchart of a method 800 for destination storage system 304 (FIG. 6) to handle SCSI-3 reservations from host computers 306 (FIG. 6) in another example of the present disclosure. The method 800 may be implemented by a system manager on destination storage system 304. The method 800 is a variation of method 700 (FIG. 7). The method 800 may begin in block 802 on FIG. 8.

In block 802, destination storage system 304 discovers volume 310 on source storage system 302. For this to occur, destination storage system 304 is defined as a host on source storage system 302 and source storage system 302 exports volume 310 to destination storage system 304 so destination storage system 304 is able to discover and access volume 310 via source storage system 302. The block 802 may be followed by block 804.

In block 804, destination storage system 304 admits volume 310 so volume 310 may be exported to host computer systems 306. The block 804 may be followed by block 806.

In block 806, destination storage system 304 exports volume 310 to host computer systems 306 so host computers 306 are able to discover volume 310 and access volume 310 via destination storage system 304. The block 806 may be followed by block 808.

In block 808, destination storage system 304 registers internally keys for paths 308-1 to 308-6 between host computers 306 and destination storage system 304. This occurs in response to host computers 306 requesting to register their keys to corresponding paths 308-1 to 308-6 between the respective host computers 306 and destination storage system 304. The block 808 may be followed by block 810.

In block 810, destination storage system 304 registers with source storage system 302 the keys for virtual paths 308-7(1), (2), (3) and 308-8(1), (2), (3). The block 810 may be followed by block 812.

In block 812, destination storage system 304 determines if a host computer 306 has requested to reserve volume 310. If so, block 812 may be followed by block 814. Otherwise block 812 may be followed by block 818.

In block 814, destination storage system 304 internally reserves volume 310 for paths that have registered keys. The block 814 may be followed by block 816.

In block 816, destination storage system 304 performs reservation forwarding by requesting source storage system 302 to reserve volume 310 for paths that have registered keys. The block 816 may be followed by block 818.

In block 818, destination storage system 304 determines if a host computer 306 has requested to revoke a registered key. If so, block 818 may be followed by block 820. Otherwise block 818 may be followed by block 824 on FIG. 9.

In block 820, destination storage system 304 requests source storage system 302 to revoke the registered key, thereby denying access to volume 310 along any path to source storage system 302 associated with the registered key. The block 820 may be followed by block 822.

In block 822, destination storage system 304 internally revokes the registered key, thereby denying access to volume 310 along any path to destination storage system 304 associated with the registered key. The block 822 may be followed by block 824 on FIG. 9.

In block 824, destination storage system 304 determines if a host computer 306 has requested to access volume 310 along a particular path. If so, block 824 may be followed by block 826. Otherwise block 824 may be followed by block 840.

In block 826, destination storage system 304 internally determines if the incoming I/O requests along the particular path are associated with a registered key. If so, block 826 may be followed by block 830. Otherwise block 826 may be followed by block 828.

In block 828, destination storage system 304 reports back a reservation conflict to the requesting host computer 306 as the key has been revoked and access to volume 310 has been denied. The block 828 may be followed by block 840.

In block 830, destination storage system 304 requests source storage system 302 to access volume 310 along a particular path associated with the key. The block 830 may be followed by block 832.

In block 832, destination storage system 304 determines if source storage system 302 has reported a reservation conflict because the key is not registered at source storage system 302. If so, block 832 may be followed by block 834. Otherwise block 832 may be followed by block 838.

In block 834, destination storage system 304 reports back a reservation conflict to the requesting host computer 306 as the key has been revoked and access to volume 310 has been denied. In one example, the reservation conflict causes destination storage system 304 to scan the state at source storage system 302, including the registered keys and the current reservation status of volume 310, and to update its local state to be consistent. The block 834 may be followed by block 840.

In block 838, destination storage system 304 handles the I/O requests from the requesting host computer 306 to volume 310. The block 838 may be followed by block 840.

In block 840, destination storage system 304 handles any release of volume 310. When a reservation has been placed on volume 310 internally at destination storage system 304, destination storage system 304 may receive a request to release the reservation on volume 310 from a host computer 306. If so, destination storage system 304 removes the reservation on volume 310 to allow access to volume 310 via destination storage system 304 without a registered key. The destination storage system 304 also forwards the release to source storage system 302 to allow access to volume 310 via source storage system 302 without a registered key.

When a reservation has been placed on volume 310 at source storage system 302, destination storage system 304 may periodically scan the states at source storage system 302 to determine if volume 310 has been released. The block 840 may be followed by block 842.

In block 842, destination storage system 304 determines if it is to perform data migration. If so, block 842 may be followed by block 844. Otherwise block 842 may be followed by block 844.

In block 844, destination storage system 304 requests source storage array 302 to revoke all registered keys. Destination storage system 304 also requests source storage array 302 to reserve volume 310 to fence off access by all other hosts. At this time, source storage array 302 is disconnected from host computers 306. The block 844 may be followed by block 812 on FIG. 8.

In block 846, destination storage system 304 migrates data from source storage system 302.

Figure 10:
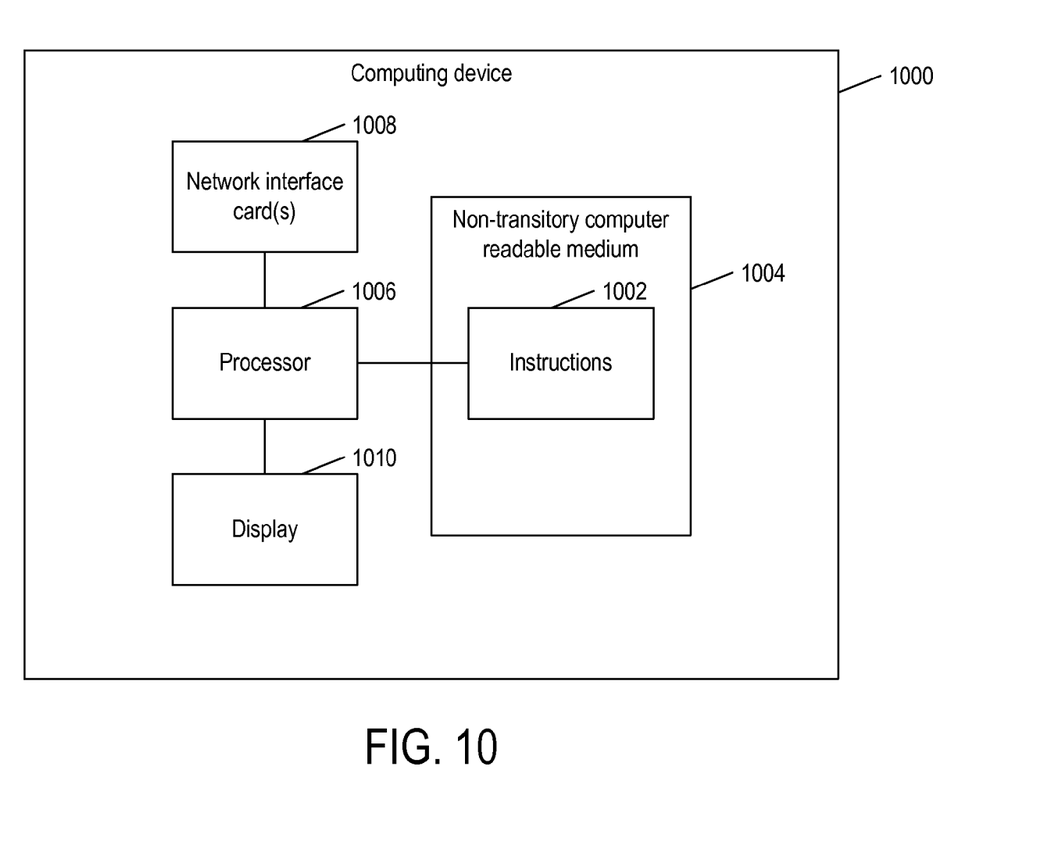
FIG. 10 is a block diagram of a computing device for implementing the storage system in one example of the present disclosure.

FIG. 10 is a block diagram of a computing device 1000 for implementing the techniques of the present disclosure including, for example, destination storage system 300 (FIGS. 3 and 6) in one example of the present disclosure. Computing device 1000 includes processor executable instructions 1002 stored in a non-transitory computer readable medium 1004, such as hard disk drive, a solid state drive, or another non-volatile computer memory. A processor 1006 executes instructions 1002 to provide the described features and functionalities, which may be implemented by sending instructions and data to one or more network interface cards 1008 or a display 1010.

As described above, in one example, the present disclosure may allow a complete cluster of host computers to be migrated in a seamless fashion. This approach may allow all of the features of the cluster (failover, high availability, load balancing etc.) to continue to operate during the migration process, without requiring any outage period or extensive coordination of switchover for the cluster as a whole so the host computer systems retain access to their data. However, the methods for handling SCSI-2 and SCSI-3 reservations also have applications outside of data migration. An additional example for reservation forwarding may include handling geo-clustered arrays for failover scenarios. In this example, both arrays are handling the same data but consistency is required across them in case one fails so that the other can take over and have full knowledge of the current reservation state.

Various other adaptations and combinations of features of the examples disclosed are within the scope of the invention.

What is claimed is:

1. A method performed by a destination storage system comprising:
    discovering a volume on a source storage system so the destination storage system is able to access the volume via the source storage system, the volume being already accessible to host computer systems via the source storage system;
    exporting the volume to the host computer systems so the host computer systems are able to simultaneously access the volume via the destination storage system and the source storage system; and
    while the host computer systems are able to simultaneously access the volume via the destination storage system and the source storage system, handle competing volume reservations by:
        locally registering keys for first paths between the host computer systems and the destination storage system;
        registering with the source storage system the keys for second paths between virtual ports at the destination storage system and the source storage system; and
        when one of the host computer systems requests to reserve the volume:
            locally reserving the volume for paths to the destination storage system having registered keys; and
            performing reservation forwarding, comprising requesting the source storage system to reserve the volume for paths to the source storage system having registered keys.

2. The method of claim 1, wherein the keys comprise SCSI-3 reservation keys, and the volume is reserved with SCSI-3 reserve commands.

3. The method of claim 1, further comprising:
    when a host computer system requests to revoke a registered key:

locally revoking the registered key to prevent access to the volume via one or more of the paths associated to the destination storage system that are associated with the revoked key; and requesting the source storage system to revoke the registered key to prevent access to the volume via one or more of the paths to the source storage system that are associated with the revoked key.

4. The method of claim 3, further comprising:
when an other host computer system requests to access the volume, determining the request is along a path associated with the revoked key and reporting a reservation conflict back to the other host computer system.

5. The method of claim 1, further comprising:
when a host computer system requests to access the volume, determining if the request is along a path to the destination storage system associated with a registered key; and
when the request is along a path to the destination storage system associated with a registered key:
requesting the source storage system to access the volume along a path to the source storage system associated with the registered key; and
when the source storage system reports a reservation conflict:
reporting the reservation conflict back to the host computer system; and
locally revoking the registered key.

6. The method of claim 1, further comprising, prior to exporting the volume to the host computer systems, admitting the volume on the destination storage system so the volume is exportable to the host computer systems.

7. The method of claim 1, further comprising:
revoking the registered keys;
reserving the volume; and
migrating data from the source storage system to the destination storage system.

8. A non-transitory computer readable medium encoded with executable instructions for execution by a processor of a first storage system to:
discover a volume on a second storage system so the first storage system is able to access the volume via the second storage system, the volume being already accessible to host computer systems via the second storage system;
export the volume to the host computer systems so the host computer systems are able to simultaneously access the volume via the first storage system and the second storage system; and
to handle competing volume reservations while the host computer systems are able to simultaneously access the volume via the first storage system and the second storage system, the processor is to:
locally register keys for first paths between the host computer systems and the first storage system;
register with the second storage system the keys for second paths between virtual ports at the first storage system and the second storage system; and
when one of the host computer systems requests to reserve the volume:
locally reserve the volume for paths to the first storage system having registered keys; and
perform reservation forwarding, comprising requesting the second storage system to reserve the volume for paths to the second storage system having registered keys.

9. The medium of claim 8, wherein the keys comprise SCSI-3 reservation keys, and the volume is reserved with SCSI-3 reserve commands.

10. The medium of claim 8, further comprising:
when a host computer system requests to revoke a registered key:
locally revoke the registered key to prevent access to the volume via one or more of the paths associated to the first storage system that are associated with the revoked key; and
request the second storage system to revoke the registered key to prevent access to the volume via one or more of the paths to the second storage system that are associated with the revoked key.

11. The medium of claim 10, further comprising:
when an other host computer system requests to access the volume, determine the request is along a path associated with the revoked key and report a reservation conflict back to the other host computer system.

12. The medium of claim 8, further comprising:
when a host computer system requests to access the volume, determine if the request is along a path to the destination storage system associated with a registered key; and
when the request is along a path to the first storage system associated with a registered key:
request the second storage system to access the volume along a path to the second storage system associated with the registered key; and
when the second storage system reports a reservation conflict:
report the reservation conflict back to the host computer system; and
locally revoke the registered key.

13. The medium of claim 8, further comprising, prior to export the volume to the host computer systems, admit the volume on the first storage system so the volume is exportable to the host computer systems.

14. The medium of claim 8, further comprising:
revoke the registered keys;
reserve the volume; and
migrate data from the second storage system to the first storage system.

15. A destination storage array, comprising:
a network interface coupled to host computers and a source storage array, a volume on the source storage array being accessible to the host computers via the source storage array;
a memory storing processor executable instructions; and
a processor to:
discover a volume on the source storage array so the destination storage array is able to access the volume via the source storage array;
export the volume from the destination storage array to the host computers so the host computers are able to simultaneously access the volume via the destination storage array and the source storage array;
to handle competing volume reservations while the host computer systems are able to simultaneously access the volume via the destination storage system and the source storage system, the processor is to:
locally register keys for first paths between the host computers and the destination storage array;
register with the source storage array the keys for second paths between virtual ports at the destination storage array and the source storage array;

when one of the host computers requests to reserve the volume:
- locally reserve the volume for paths to the destination storage array having registered keys; and
- perform reservation forwarding, comprising requesting the source storage array to reserve the volume for paths to the source storage array having registered keys; and when one of the host computers requests to revoke a registered key:
- locally revoke the registered key to prevent using the revoked key to access to the volume via the destination storage array; and
- request the source storage array to revoke the registered key to prevent using the revoked key to access to the volume via the source storage array.

16. The destination storage array of claim 15, wherein the keys comprise SCSI-3 reservation keys, and the volume is reserved with SCSI-3 reserve commands.

17. The destination storage array of claim 15, further comprising the processor to:
when a host computer system requests to revoke a registered key:
- locally revoke the registered key to prevent access to the volume via one or more of the paths associated to the destination storage array that are associated with the revoked key; and
- request the source storage array to revoke the registered key to prevent access to the volume via one or more of the paths to the source storage array that are associated with the revoked key.

18. The destination storage array of claim 17, further comprising the processor to:
when an other host computer requests to access the volume, determine the request is along a path associated with the revoked key and report a reservation conflict back to the other host computer.

19. The destination storage array of claim 15, further comprising the processor to:
when a host computer requests to access the volume, determine if the request is along a path to the destination storage array associated with a registered key; and
when the request is along a path to the destination storage array associated with a registered key:
- request the source storage array to access the volume along a path to the source storage array associated with the registered key; and
- when the source storage array reports a reservation conflict:
    - report the reservation conflict back to the host computer; and
    - locally revoke the registered key.

20. The destination storage array of claim 15, further comprising the processor to:
- revoke the registered keys;
- reserve the volume; and
- migrate data from the source storage array to the destination storage array.

* * * * *